United States Patent
Lee et al.

(10) Patent No.: US 12,197,356 B2
(45) Date of Patent: Jan. 14, 2025

(54) COLLECTION OF RUNTIME INFORMATION FOR DEBUG AND ANALYSIS, INCLUDING BY AGGREGATING STATUS INFORMATION INTO A STANDARDIZED MESSAGE FORMAT AND TIMESTAMPING

(71) Applicant: Beijing Tenafe Electronic Technology Co., Ltd., Beijing (CN)

(72) Inventors: Meng Kun Lee, Cupertino, CA (US); Priyanka Nilay Thakore, Mountain View, CA (US); Chen Xiu, Beijing (CN); Lyle E. Adams, San Jose, CA (US); Xiaojun Ding, Shanghai (CN)

(73) Assignee: Beijing Tenafe Electronic Technology Co., Ltd. (CN)

( * ) Notice: Subject to any disclaimer, the term of this patent is extended or adjusted under 35 U.S.C. 154(b) by 0 days.

(21) Appl. No.: 18/426,097

(22) Filed: Jan. 29, 2024

(65) Prior Publication Data
US 2024/0168897 A1    May 23, 2024

Related U.S. Application Data

(63) Continuation of application No. 18/073,056, filed on Dec. 1, 2022, now Pat. No. 11,921,654, which is a
(Continued)

(51) Int. Cl.
G06F 13/16    (2006.01)
(52) U.S. Cl.
CPC ...... *G06F 13/1694* (2013.01); *G06F 13/1689* (2013.01); *G06F 2213/0038* (2013.01)
(58) Field of Classification Search
CPC .. G06F 13/1694; G06F 13/20; G06F 13/1389; G06F 13/28; G06F 13/385; G06F 13/36
See application file for complete search history.

(56) References Cited

U.S. PATENT DOCUMENTS

| 6,795,963 B1 | 9/2004 | Andersen |
| 7,251,751 B2 | 7/2007 | Blasco Allue |

(Continued)

FOREIGN PATENT DOCUMENTS

| CN | 101901145 | 12/2010 |
| CN | 106575249 | 4/2017 |

(Continued)

OTHER PUBLICATIONS

Author Unknown, Intel® Quartus® Prime Pro Edition User Guide: Debug Tools, Jun. 21, 2021.
(Continued)

*Primary Examiner* — Raymond N Phan
(74) *Attorney, Agent, or Firm* — Van Pelt, Yi & James LLP

(57) ABSTRACT

If a first group selection setting is set to TRUE, an NVM Express (NVMe) processor sends a first set of NVMe status information that includes a transfer data end event. If a second group selection setting is set to TRUE, the NVMe processor sends a second set of NVMe status information that includes an NVMe error event. A firmware functional module sends firmware status information. The aggregation module aggregates and timestamps the first and second sets of NVMe status information, if any, and the firmware status information to obtain a timestamped and aggregated message stream that is output by an interface. The timestamped and aggregated message stream enables a visualization system to analyze the NVMe processor and the firmware functional module. The NVMe processor, firmware functional module, aggregation module, and interface are in a storage controller, implemented on a system on chip (SOC), that manages a storage medium.

12 Claims, 6 Drawing Sheets

Related U.S. Application Data continuation of application No. 17/854,435, filed on Jun. 30, 2022, now Pat. No. 11,544,210.

(60) Provisional application No. 63/222,257, filed on Jul. 15, 2021.

(56) References Cited

U.S. PATENT DOCUMENTS

| | | | |
|---|---|---|---|
| 7,886,150 | B2 | 2/2011 | Stollon |
| 8,499,201 | B1 | 7/2013 | Chiu |
| 9,053,251 | B2 | 6/2015 | Adler |
| 9,830,241 | B2 | 11/2017 | Lippett |
| 9,959,186 | B2 | 5/2018 | Hutner |
| 10,691,576 | B1 | 6/2020 | Shapira |
| 11,438,255 | B2 | 9/2022 | Tillotson |
| 11,438,282 | B2 * | 9/2022 | Cotner ............... H04L 51/02 |
| 11,544,210 | B1 | 1/2023 | Lee |
| 2010/0107143 | A1 | 4/2010 | Emberling |
| 2014/0052930 | A1 * | 2/2014 | Gulati ............. G06F 11/3636 |
| | | | 714/45 |
| 2014/0239987 | A1 | 8/2014 | Mayer |
| 2015/0046617 | A1 * | 2/2015 | Shirlen ............ G06F 11/3466 |
| | | | 710/117 |
| 2015/0082325 | A1 | 3/2015 | Aharonov |
| 2016/0077905 | A1 | 3/2016 | Menon |
| 2016/0292057 | A1 | 10/2016 | Segger |
| 2019/0294598 | A1 * | 9/2019 | Hsiao .................. G06F 16/22 |

FOREIGN PATENT DOCUMENTS

| | | |
|---|---|---|
| CN | 107257953 | 10/2017 |
| CN | 107273427 | 10/2017 |
| JP | 2018055326 | 4/2018 |
| TW | 201133008 | 10/2011 |

OTHER PUBLICATIONS

Author Unknown, Ise Tutorial: Using Xilinx ChipScope Pro ILA Core with Project Navigator to Debug FPGA Applications, Mar. 20, 2013.

* cited by examiner

| Functional Module: NVM Express (NVMe) Processor | | | |
|---|---|---|---|
| Group | Select | Event ID | Event Description |
| 0 | True/False | 0 | Write Transfer End |
| 0 | True/False | 1 | Read Transfer End |
| 0 | True/False | 2 | NVMe Command Start |
| 1 | T/F | 7 | NVMe Error |
| 2 | True/False | 3 | Write Transfer Command Start |
| 2 | True/False | 4 | Read Transfer Command Start |
| 2 | True/False | 5 | NVMe Command End |

| Functional Module: Error Correction Decoder | | | |
|---|---|---|---|
| Group | Select | Event ID | Event Description |
| 0 | T/F | 0 | Decoder End (Write Decoded Data) |
| 1 | T/F | 7 | Decoder Error |
| 2 | T/F | 1 | Decoder Start (Read Encoded Data) |

FIG. 5

COLLECTION OF RUNTIME INFORMATION FOR DEBUG AND ANALYSIS, INCLUDING BY AGGREGATING STATUS INFORMATION INTO A STANDARDIZED MESSAGE FORMAT AND TIMESTAMPING

CROSS REFERENCE TO OTHER APPLICATIONS

This application is a continuation of U.S. patent application Ser. No. 18/073,056 entitled COLLECTION OF RUNTIME INFORMATION FOR DEBUG AND ANALYSIS, INCLUDING BY AGGREGATING STATUS INFORMATION INTO A STANDARDIZED MESSAGE FORMAT AND TIMESTAMPING filed Dec. 1, 2022, which is a continuation of U.S. patent application Ser. No. 17/854,435, now U.S. Pat. No. 11,544,210, entitled COLLECTION OF RUNTIME INFORMATION FOR DEBUG AND ANALYSIS filed Jun. 30, 2022, which claims priority to U.S. Provisional Patent Application No. 63/222,257 entitled COLLECTION OF RUNTIME INFORMATION FOR DEBUG AND ANALYSIS filed Jul. 15, 2021, each of which is incorporated herein by reference for all purposes.

BACKGROUND OF THE INVENTION

Unexpected behaviors in embedded and/or system on chip (SOC) systems are notoriously difficult to debug given the real-time nature and the complexity of such systems. Debugging techniques that work with other types of systems (such as invasive debug probes added at key locations in non-real-time systems, "brute force" debug in simple systems, and the addition of probes at easily accessed points in distributed systems) are not easily portable and/or feasible with some embedded and/or SOC systems. New techniques that provide better tools and/or techniques for analyzing, debugging, and/or monitoring such systems would be desirable.

BRIEF DESCRIPTION OF THE DRAWINGS

Various embodiments of the invention are disclosed in the following detailed description and the accompanying drawings.

FIG. 5 is a diagram illustrating an embodiment of selectable groups of events in a Flash storage controller application.

DETAILED DESCRIPTION

Figure 1:
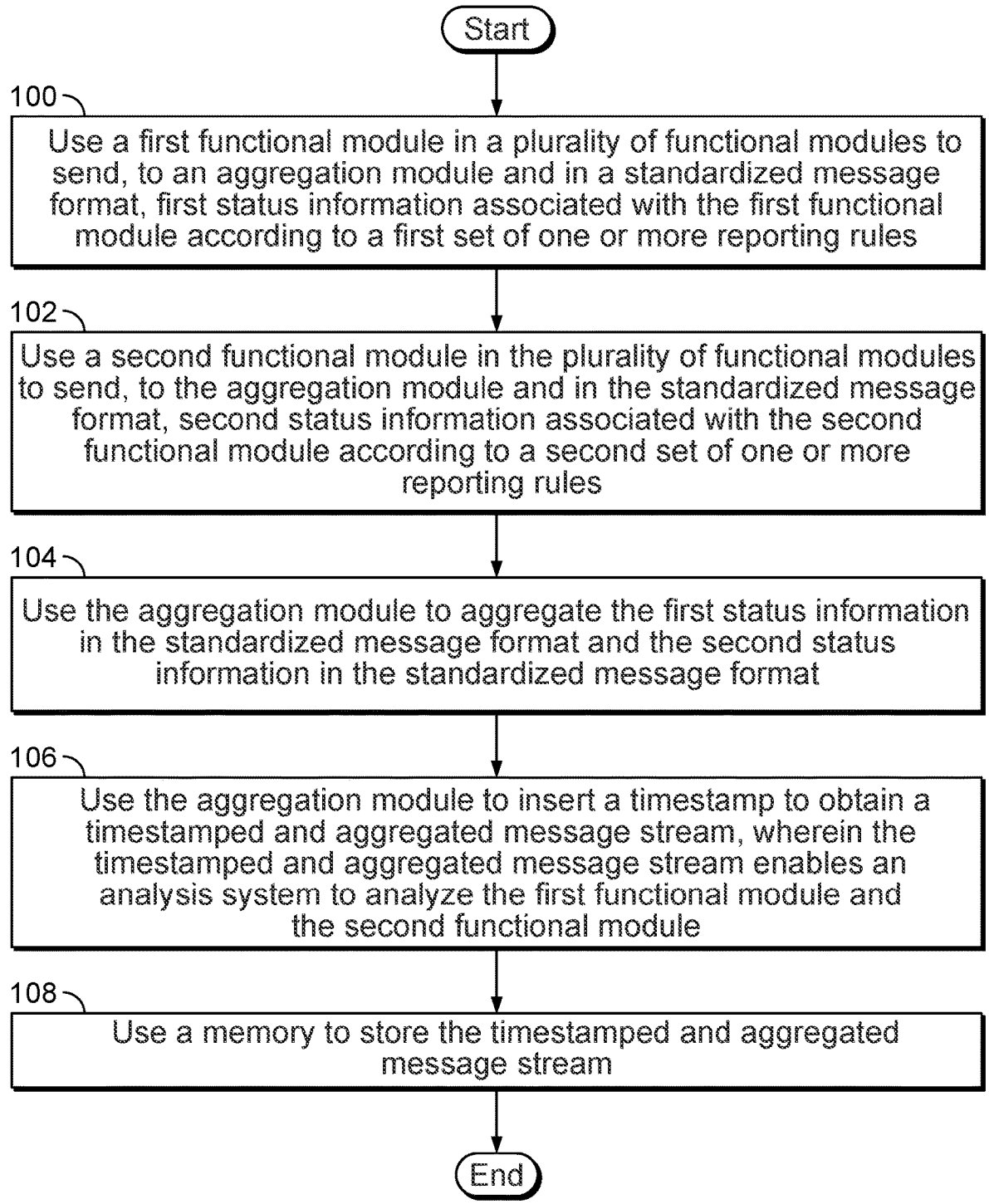
FIG. 1 is a flowchart illustrating an embodiment of a process to generate and store timestamped and aggregated messages which in turn may be used to analyze functional modules in an SOC system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Various embodiments of a technique and/or system to capture, generate, and/or save (e.g., state, status, and/or event information) information that may be used to analyze the behavior of an embedded and/or system on chip (SOC) system (as or if desired) are described herein. As used herein, the terms "embedded system" and "SOC (system)" are used interchangeably. For applications where there are many instances of an SOC system in operation, existing debug and/or analysis techniques are insufficient. For example, suppose a storage controller (such as a solid state drive (SSD) controller) is implemented on an SOC system. For large storage systems, such as a cloud and/or enterprise storage systems, there may be hundreds or even thousands storage controllers in operation. Existing debug techniques may only expose a limited number of I/O test pins (e.g., on the order of four or eight I/O test pins) which is often insufficient given the number and complexity of the various functional modules in a single SOC system, plus the sheer number of embedded and/or SOC systems in operation. Using the techniques described below, information may be generated and stored that enable a visualization system to review, debug, or otherwise analyze the operation of functional modules in one or more SOC systems in greater detail and/or with better (e.g., timestamp and/or cross functional module) annotation than was available before. The following figure describes one embodiment of this technique to generate such information.

FIG. 1 is a flowchart illustrating an embodiment of a process to generate and store timestamped and aggregated messages which in turn may be used to analyze functional modules in an SOC system. In some embodiments, the process is performed by an SOC system that is configured to perform the steps described below.

At 100, a first functional module in a plurality of functional modules is used to send, to an aggregation module and in a standardized message format, first status information associated with the first functional module according to a first set of one or more reporting rules.

At 102, a second functional module in the plurality of functional modules is used to send, to the aggregation module and in the standardized message format, second status information associated with the second functional module according to a second set of one or more reporting rules. It is noted that the status information, content, and/or payload in the standardized message format may be different for the first functional module (e.g., at step 100) versus that in the second function module (e.g., at step 102), but the two functional modules use the same standardized message format to package or otherwise encapsulate their information.

As used herein, the term "functional module" refers to any logical or defined module (e.g., defined in RTL or code) for which status information (e.g., including state information, event information, etc.) is captured. A functional module may (for example) perform or support one or more operations and have inputs and outputs via which that functional module communicates with and/or is coupled to other functional modules in the SOC system. For example, in the RTL that describes the hardware or in the code that comprises the firmware, a functional module may correspond to a hardware or firmware module in the RTL or firmware code, respectively. In various embodiments, a functional module may be a firmware module or a hardware module. In various embodiments, the first and second functional modules may be the same type (e.g., both the first and second functional modules are hardware) or different types (e.g., the first functional module is firmware and the second functional module is hardware). In some embodiments, a functional module includes both a CPU (or other embedded processor) and firmware that is configured to run on that CPU in the (same) functional module.

The reporting rules (e.g., referred to in steps 100 and 102) define, for a corresponding functional module, what status information to include in the standardized message format and when to send such information. In one example, the first and second functional modules have different functionalities and/or support a different set of functions and therefore the reporting rules for those functional modules are different (e.g., tailored to each functional module and what would be of interest during debug and/or analysis for that functional module). Alternatively, if there are duplicate functional modules then the report rules may be identical.

In some embodiments, the reporting rules include an event-based reporting rule where status information is sent (e.g., once, each time a given event is detected) if a predefined condition or event (e.g., described in the reporting rules) is met or otherwise satisfied in a given functional module. The reporting rules in such embodiments further include what status information to include in the standardized message format when a given event occurs. For example, suppose that a functional module is associated with communicating over a channel where this operation is bookended by a start event and an end event with one or more intermediate events (e.g., event(s) associated with handshaking, obtaining access to a shared communication channel, acknowledgement of a transmission, etc.). If one of these events occurs, then the reporting rules may (as example) instruct the functional module to include (e.g., in the standardized message format): (1) information that identifies the event and (2) selected information related to that particular event (e.g., an associated state machine, a status of an associated buffer, a status of a communication partner, a pointer or location where the transmitted message is located, a sequence number or other metadata associated with a transmitted message, etc.), space in the standardized message format permitting.

In some embodiments, the reporting rules include a time-based reporting rule where if the functional module satisfies a condition specified in the time-based reporting rule, status information (specified by the time-based reporting rule) is periodically sent (e.g., at predefined or set time intervals) until the condition is no longer satisfied. Conceptually, time-based reporting is similar to I/O test pins that expose select signals or registers within an SOC, except the reporting occurs in discrete time (not continuous time) and the reporting only occurs when the condition is satisfied. Furthermore, the scope and/or number of signals that are reported exceeds that of the typical four or eight signals that are exposed by the limited number of I/O test pins. Also, the timestamp that is applied by the aggregation module allows for cross reference of different signals or pieces of information (e.g., within a given functional module or across functional modules) during analysis and/or display. As a practical matter, to keep the amount of status information that is reported to a more manageable or tractable amount of information, time-based reporting (at least in this example) occurs only when a condition is satisfied in this example. (Alternatively, there may be no condition and the specified status information is always reported in some embodiments.) In one example, if the status information being reported is the value or state of a finite state machine in a functional module, then the value or state is (only) reported while the finite state machine is not in the idle state.

At 104, the aggregation module is used to aggregate the first status information in the standardized message format and the first status information in the standardized message format. In some embodiments, each functional module has a dedicated link to the aggregation module via which the messages (e.g., with the standardized format and containing the status information) are sent to the aggregation module. As the messages are received on these dedicated links, they may be merged from the multiple streams into a single stream.

At 106, the aggregation module is used to insert a timestamp to obtain a timestamped and aggregated message stream, wherein the timestamped and aggregated message stream enables a visualization system to analyze the first functional module and the second functional module. In various embodiments, aggregation (e.g., at step 104) may be performed first followed by timestamping (e.g., at step 106) or vice versa, as desired.

The insertion of timestamps enables a visualization system (that ingests the timestamped and aggregated stream) to align different status information from the various functional modules along a common time axis. Similarly, within a single functional module, the timestamps throughout the timestamped and aggregated message stream permit comparison and/or time correlation of status information associated with different reporting rules (e.g., one event-based reporting rule is to search for event X and another event-based reporting rule is to search for event Y in a single functional module).

In some embodiments, timestamping (e.g., at step 106) is performed in manner that permits the subsequent comparison of status information from different SOC systems using a common time axis or time reference. For example, this can be done by synchronizing the timestamp value in the SOC with a timestamp value of the host system with which the SOC system is interacting. Alternatively, in some embodiments there is no attempt to establish a common time axis or time reference because when comparing different SOC for a given sequence of events, the time between events and time for 1 I/O to flow from one end to another is the comparison factor.

At 108, a memory is used to store the timestamped and aggregated message stream. As will be described in more detail below, the memory may act as a buffer with the timestamped and aggregated message stream exported from the SOC system as soon as possible so that the memory does not overflow. In some embodiments, the timestamped and aggregated message stream is sent from the memory (e.g., on the SOC system) to a visualization system (e.g., for immediate and/or real-time debug or analysis). Alternatively, the timestamped and aggregated message stream may be sent from the memory (e.g., on the SOC system) to some off-SOC storage medium from which it can be subsequently retrieved by a visualization system if analysis is later desired.

As described above, in some embodiments, the first set of one or more reporting rules includes an event-based reporting rule; and sending the first status information in the standardized message format includes: determining whether the first functional module satisfies the event-based reporting rule; and in response to determining that the first functional module satisfies the event-based reporting rule, sending, to the aggregation module and in the standardized message format, status information that is specified by the event-based reporting rule.

As described above, in some embodiments, the first set of one or more reporting rules includes a time-based reporting rule; and sending the first status information in the standardized message format includes: determining whether the first functional module satisfies the time-based reporting rule; and while the first functional module satisfies the time-based reporting rule, periodically sending, to the aggregation module and in the standardized message format, status information that is specified by the time-based reporting rule.

In contrast with debug techniques that are limited to just a handful of test I/O pins, a much more complete and richer picture of the SOC system can be obtained using the process of FIG. 1. For example, the limited number of test I/O pins can often only expose one state machine associated with one functional module (as an example); this does not offer insight as to what is going on with other functional modules at the same time, given the limited number of test I/O pins.

Furthermore, because the functional modules can be hardware modules and/or firmware modules, the process of FIG. 1 permits the comparison and/or cross-correlation of what both the firmware and the hardware are doing. This is supported by the common insertion point of the timestamps (e.g., the aggregation module) so that hardware status information (e.g., from a given hardware module) and a firmware status information (e.g., from a given firmware module) can be properly placed along a common time axis for presentation or display to a user.

It is noted that designing and constructing the debug infrastructure and/or module(s) that performs the process of FIG. 1 is relatively time consuming. Large-scale storage systems (e.g., cloud and/or enterprise storage systems) that use hundreds or even thousands of storage controllers (e.g., each of which may be implemented on an SOC system) are much harder to debug; in such applications, investing in a robust debug infrastructure is a worthwhile investment. Even for smaller implements with only one storage controller, it may be worthwhile to invest in the infrastructure and/or module(s) described herein because it is helpful for performance tuning since one storage device is representative of all storage devices.

It may be helpful to illustrate an example system which performs the process of FIG. 1. The following figure shows one such example.

Figure 2:
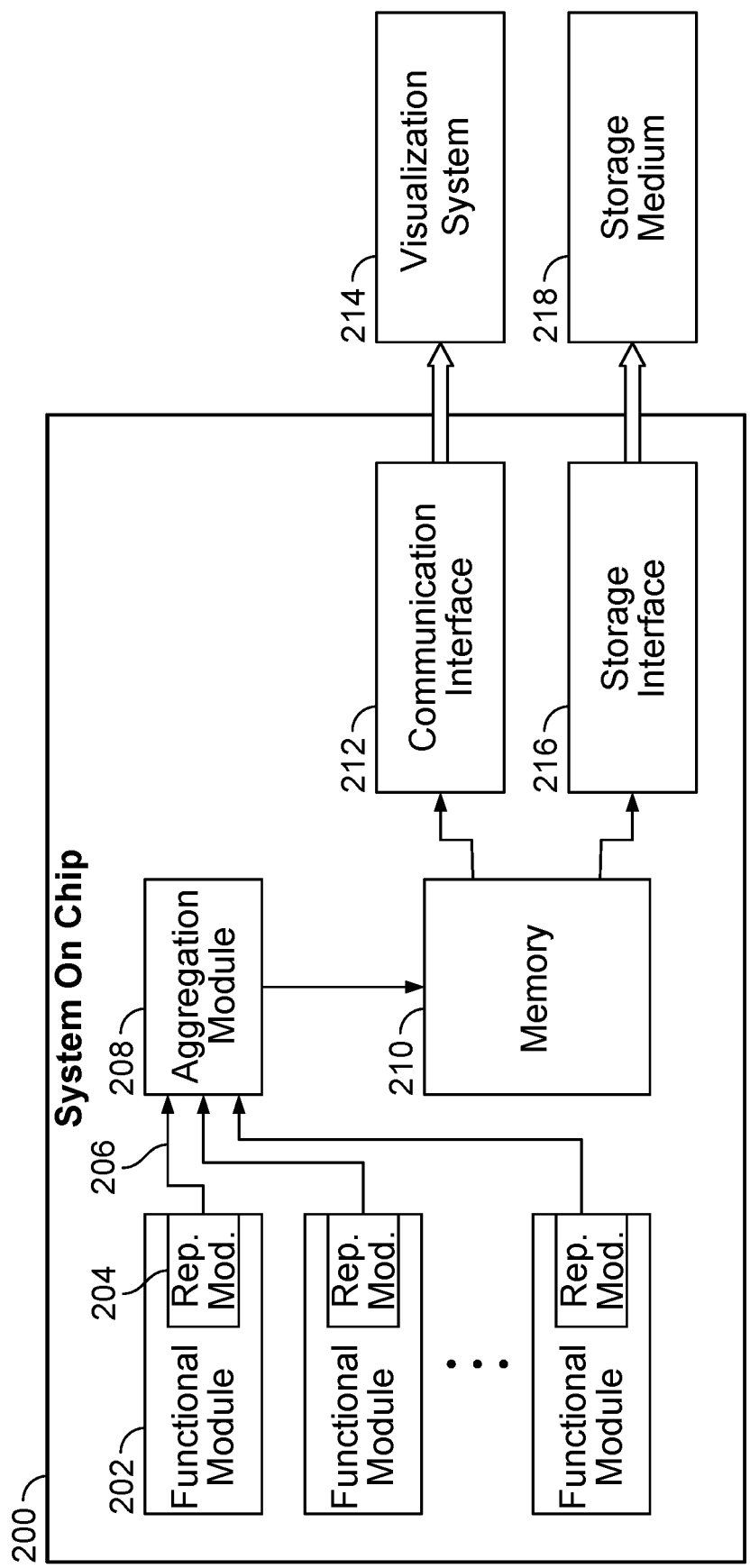
FIG. 2 is a system diagram illustrating an embodiment of an SOC system with reporting modules in each functional module to collect and store status information.

FIG. 2 is a system diagram illustrating an embodiment of an SOC system with reporting modules in each functional module to collect and store status information. In this example, the exemplary SOC system (200) includes a plurality of functional modules (202). In various embodiments, the exemplary SOC system (200) is an application-specific integrated circuit (ASIC), a field-programmable gate array (FPGA), etc. In various embodiments, a functional module (202) is a hardware module composed solely of electronic circuits, a firmware module composed of instruction code operating on a processing unit, etc.

In this example, the ability to analyze (e.g., in real-time or after some wait) the behavior and/or operation of each of the plurality of functional modules (202) is desired. For example, each of the functional module may contribute to the critical processing or movement of data, making subsequent analysis and/or review highly desirable. To that end, each functional module (202) has a sub-component, referred to in this figure as a reporting module (204), that gathers status information from within its functional module, encapsulates that status information into a message, and sends the encapsulated information on a dedicated link (206) to a central message gathering module, referred to in this figure as an aggregation module (208). In some embodiments, less critical and/or less interesting (from a debug perspective) functional modules do not have a reporting module.

In this example, each reporting module (204) includes one or more reporting rules (not shown) which describes the conditions under which time-based messages and/or event-based messages are generated and sent. These reporting rules may also describe what specific registers, values, nodes, states, etc. should be included or otherwise used as the status information that is sent to the aggregation module (208). For example, each reporting module (204) may include a controller that compares the condition(s) specified in the reporting rules against the relevant variables, states, events, etc. in that particular functional module.

In this example, each reporting module (204) has a dedicated link (206) to the aggregation module (208). Although a shared link could be used, shared links have the potential lose messages at the reporting modules if the shared link is being used by another reporting module and the underserved reporting module runs out of buffer. For example, suppose one of the functional modules has a burst of messages; with a shared link, the bursty functional module may starve the non-bursty functional modules. Using a dedicated link reduces the likelihood of such lost messages.

Since timestamping is performed at the aggregation module (208) and not at the reporting module (204), it is important for the messages to get to the aggregation module in a timely manner (i.e., the messages coming in from the various links are time-sensitive). This is another reason why using dedicated links (206), as opposed to shared links, may be desirable. Aggregation is also performed at the aggregation module (208), so maintaining an accurate representation of the incoming sequence is important (i.e., the messages coming in from the various links are sequence-sensitive). This is another benefit to using dedicated links (206): they help to maintain a proper and/or accurate sequence of messages. In some embodiments, the aggregation module (208) is implemented in hardware (e.g., as opposed to firmware) in order to better keep up with the messages generated by the various reporting modules (204).

In this example, to conserve power, the links (206) between the reporting modules (204) and aggregation module (208) operate at a fraction of the nominal operating frequency of the rest of the SOC system. For example, if the nominal operating frequency in the SOC system is 1 GHz then the link may operate at $\frac{1}{4}^{th}$ of that frequency (e.g., 250 MHz) or $\frac{1}{5}^{th}$ of that frequency (e.g., 200 MHz). Similarly, since the messages are relatively small (e.g., in the range of 16-64 bits), the width of each link (206) may be on the order of 16 bits whereas some buses in the rest of the SOC system (200) are on the order of 64 bits. The low frequencies and small amounts of data generated by this debug fabric allows for very low overhead to a typical system, thereby allowing this feature to be enabled at all times during real-world operation. This, in turn, enables real failure (data) capture, fast failure analysis, and/or triaging of real-world field and system failures.

In this example, messages are received from the various links (206) by the aggregation module (208) and are aggregated into a single, aggregated stream. A timestamp is then inserted into the aggregated stream to obtain a timestamped and aggregated stream. (It is noted that while this example describes aggregating first and then timestamping, the process of FIG. 1 is silent on the order and timestamping may be performed before aggregation if desired.)

The timestamped and aggregated stream is passed from the aggregation module (208) to the memory (210). From the memory (210), the timestamped and aggregated stream is transported out of the SOC system (200) via a communication interface (212) to a visualization system (214). In this example, the visualization system (214) is configured to store, filter, display, present, and/or analyze the received stream, as instructed by a user. For example, this pathway from the communication interface (212) to the visualization system (214) may be desirable if a user wants to immediately observe and/or analyze the operation of the SOC system (200) in real time.

In this example, the timestamped and aggregated stream in the memory (210) is also passed to a storage interface (216) so that the information can be exported off-chip to a (external) storage medium (218), such as Flash and/or solid state drive (SSD) memory. For example, this testing infrastructure was first prototyped and/or implemented on a storage controller and therefore the storage interface (216) was already implemented. To put it another way, in some embodiments, the storage interface (216) is a "production" interface that is/was already implemented and/or is used by the routine, non-debug-related operations supported by the SOC (200).

For illustrative purposes, multiple interfaces or pathways (e.g., 212 and 216) via which the timestamped and aggregated stream is exported from the SOC system (200) are shown in this figure. In some embodiments, only a single interface or pathway is implemented (e.g., depending upon the application and/or desire (or lack therefore) for the immediate analysis of the SOC system and/or its functional modules).

In some situations, the memory (210) becomes full. In some embodiments, if this occurs, the older messages are overwritten to continue capturing new information, or the new ones can be dropped to allow to save the old information. In some cases, older messages being overwritten by newer messages makes for better debuggability later with the assumption that any error event will trigger an interrupt to the processor and processor can interrupt such an overwrite or flush out the log containing the error. The aggregation module (208) in this example is responsible for detecting when the memory (210) becomes full and deciding how to handle it.

In one specific example, the SOC (200) is a Flash storage controller and the storage medium (218) is the Flash storage medium that is being managed and/or controlled by the Flash storage controller. In this application, since there is a storage medium (218) that is readily available and the SOC (200) controls writing to that storage medium (e.g., so there is no concern about any captured information being accidentally overwritten by another device), the information in the memory (210) is sent off-chip via a storage interface (216) and the communication interface (212) is not implemented. If analysis by a visualization system is desired, the storage medium (216) may be accessed by the visualization system to retrieve the (e.g., debugging) information stored therein.

It may be helpful to give some examples of standardized message formats that may be used by the reporting modules (204). The following figure describes some such examples.

Figure 3:
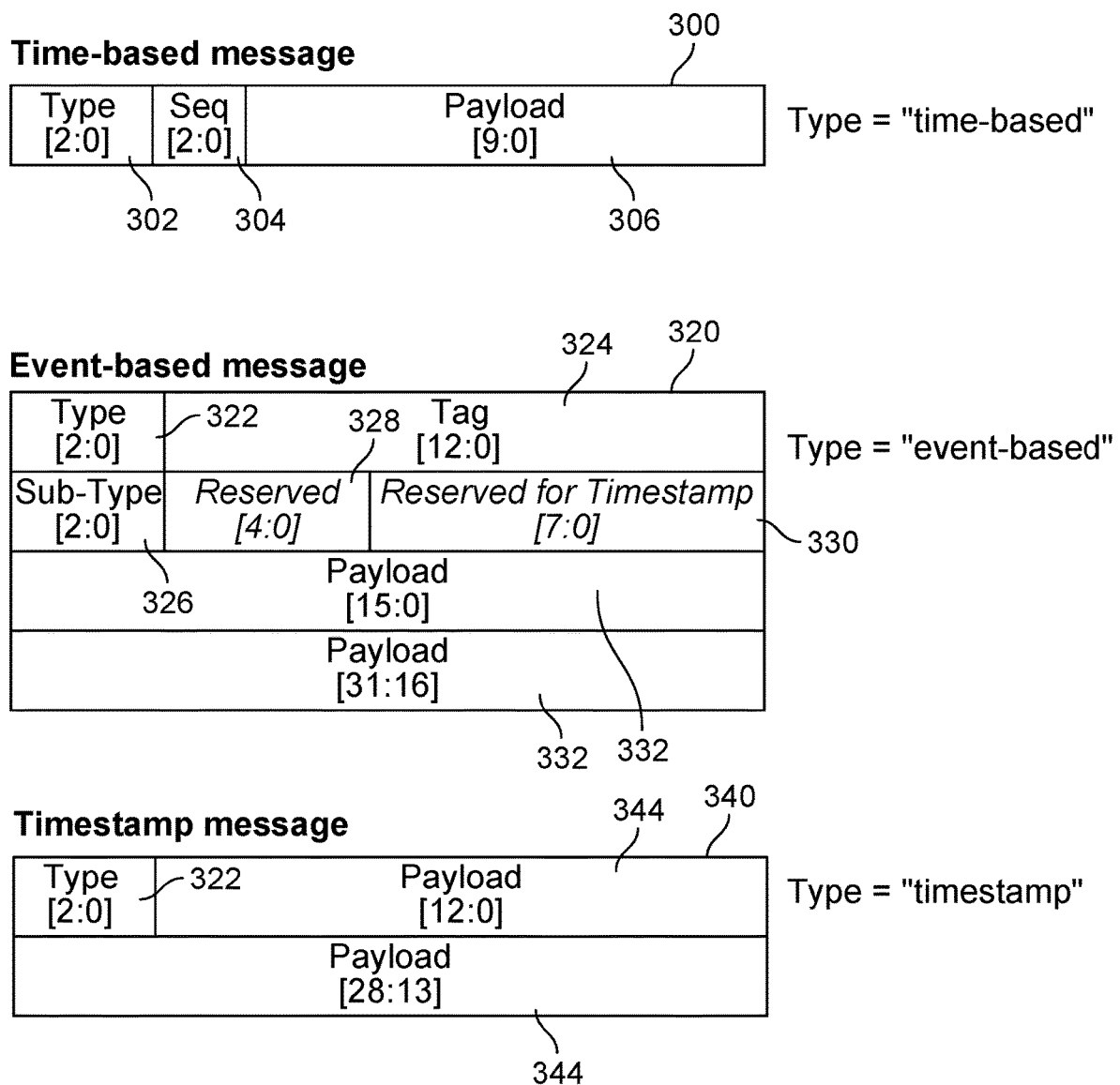
FIG. 3 is a diagram illustrating embodiments of a time-based message, an event-based message, and a timestamp message.

FIG. 3 is a diagram illustrating embodiments of a time-based message, an event-based message, and a timestamp message. These are some examples of a standardized message format in which status information may be included at steps 100 and 102 in FIG. 1. Likewise, in FIG. 2, the reporting modules (204) may use one or more of the example standardized message formats shown here to send status information to the aggregation module (208). In various embodiments, a system may support any number of standardized message formats (i.e., message types).

In this example, three message types are shown which are identified by a type field (322) in a fixed location in the message, which in this example is the first three bits of each message. The first message type in this example a time-based message (300) where the first field (comprising 3 bits) is the type field (302), with a value that identifies the message as a time-based message.

The type field (302) is followed by a 3-bit sequence field (304). This field is a time-based sequence identifier that is included for cases where the operating frequency of the given functional module is greater than the link frequency between a given reporting module (e.g., one of 204 in FIG. 2) and the aggregation module (e.g., 208 in FIG. 2). For example, this is a common occurrence when the interconnect between the ports and the aggregation modules operates at (as example) 25% of the nominal system operating frequency, which (as described above) conserves power. With the system so configured, messages may occasionally be dropped because the rate of production (e.g., by the reporting module) is greater than the rate of uptake or transport (e.g., by the aggregation module). The condition is detected and post-processed as a non-uniform increment of the sequence identifier of two adjacent messages. In one example, the sequence field (304) is incremented by one each time a new time-based message is sent so that if there a jump of two or more, then the post-processor knows some messages have been lost. In some embodiments, the sequence number (304) is based on and/or includes some bits from the timestamp that is used for the timestamp message (340).

The next field in the time-based message (300) is the payload field (306) which has 10 bits. For example, a time-based reporting rule may specify what status information to include in the payload field (306) in a time-based message (300). In one example, time-based messages (300)

are sent that include the value or state of a finite state machine when (or while) the finite state machine is not in the idle state. These time-based messages (300) continue to be periodically sent until the finite state machine returns to the idle state, at which point time-based message generation stops (at least in this example).

The second type of message in this example is the event-based message (320). As with the other message types, the first field is the 3-bit type field (322), where the value identifies the message as an event-based message.

Next are a 13-bit tag field (324) and 3-bit sub-type field (326). The sub-type field (326) is sometimes referred to as an event identifier field because the various events that are captured and reported by an event-based message are each assigned an event number or identifier. In this example, because the sub-type (i.e., event identifier) field (326) has 3 bits, the event identifiers range from 0 to 7, inclusive.

For some functional modules, having eight event identifiers is sufficient to uniquely identify all events for which recording is desired. However, some functional modules support many different types of operations (e.g., transmit as well as receive), have many intermediate events of interest between a start event and an end event, and/or have a control channel and a data channel (each with its own associated events). Therefore, in some cases, eight event identifiers is insufficient to uniquely identify all of the events for which reporting is desired. In this example, to accommodate such situations, some events share an event identifier value and some portion of the tag field (324) is used to distinguish between the events that share an event identifier value. In cases where an event identifier value is unique (i.e., it is associated with only one event), the tag is used to transmit other information, such as additional status information (e.g., per the instructions in the relevant event-based reporting rule).

Next in the event-based message (320) are two reserved fields. The first reserved field (328) is a 5-bit space reserved for replacement with an identifier of the message-producing functional module. For example, in FIG. 2, a functional module (202) would generate event-based message (320) but leave this first reserved field (328) blank. At the aggregation module (208), the first reserved field (328) is filled in by the aggregation module (208) with the identifier associated with the functional module (202) from which the event-based message (320) was received (e.g., known because the links (206) are dedicated, not shared).

The second reserved field (330) is an 8-bit field that is reserved for replacement with a timestamp. The event message timestamp (330) serves the same purpose as the time-based sequence identifier (304) in the time-based message (300). However, because event-based messages occur more sporadically than time-based messages, they need a larger field to capture a larger time difference between event-based messages (320) or between an event-based message (320) and a timestamp message (340). As with the first reserved field (328), the second reserved field is left blank by a reporting module (e.g., 204 in FIG. 2) and/or functional module (e.g., 202 in FIG. 2) and is filled in at the aggregation module (e.g., 208 in FIG. 2).

The last field in the event-based message (320) is a 32-bit payload field (332), used to carry the payload associated with the relevant event. The specific (status) information that is included in the payload (332) is specified by the relevant event-based reporting rule.

Conceptually, event-based reporting (e.g., using an event-based reporting rule) may be thought of as a (more) sparse reporting technique because only one event-based message is generated when a condition is detected. In contrast, time-based reporting (e.g., using a time-based reporting rule) is a (more) dense reporting technique because time-based messages are continuously generated while the condition is satisfied. As such, time-based reporting will tend to generate many more messages than event-based reporting. To account for this difference, the size of the exemplary time-based message (300) is smaller than the size of the exemplary event-based message (320) in this example (e.g., 16 bits for the exemplary time-based message (300) vs. 64 bits for the exemplary event-based message (320)).

The third message in this example is a timestamp message (340) which includes a 3-bit type field (342) to identify the message as a timestamp message and a 29-bit payload field (344) which is used to store the value of the timestamp. In some embodiments, the timestamp that is written into the second reserved field (330) of the event-based message (320) is the lowest eight bits of the longer timestamp that is included in the payload (344) of the timestamp message (342).

In some embodiments, generation or insertion of the timestamp message is driven by time (e.g., it's been longer than some time threshold since the last timestamp message was generated, so it is time to generate another timestamp message). In some embodiments, it is event driven. For example, since the time-based message (300) has a sequence but no timestamp, in some embodiments, timestamps are inserted if some threshold number of consecutive time-based messages has been reached (e.g., in an aggregated stream) without either an event-based message (which has a timestamp) or a timestamp message occurring.

In this example, the timestamp message (340) is not transmitted across the message interconnect (e.g., 206 in FIG. 2). Rather, timestamp messages in this example are generated and inserted by the aggregation module (e.g., 208 in FIG. 2) into the stream written to the message capture memory (e.g., 210 in FIG. 2) for accurate representation, should the message stream be interrupted for any reason (e.g., temporary memory unavailability).

As shown in this example, in some embodiments, time-stamping (e.g., at step 106 in FIG. 1) includes inserting a timestamp message (e.g., 340) into an aggregated message stream.

This example also shows that in some embodiments, timestamping (e.g., at step 106 in FIG. 1) includes writing a timestamp into a reserved field (e.g., 330) in the standardized message format (e.g., 320) that is reserved for the timestamp.

The message sizes and formatting illustrated herein are merely exemplary and are not intended to be limiting. In various embodiments, different message sizes, field sizes, and/or field locations may be used.

In this example, the sizes of the three exemplary message types (300, 320, and 340) are carefully selected so that in the capture memory (e.g., 210 in FIG. 2), the messages can be uniformly interleaved on message boundaries to prevent partial messages should message overwriting occur. The following figure shows an example of this.

Figure 4:
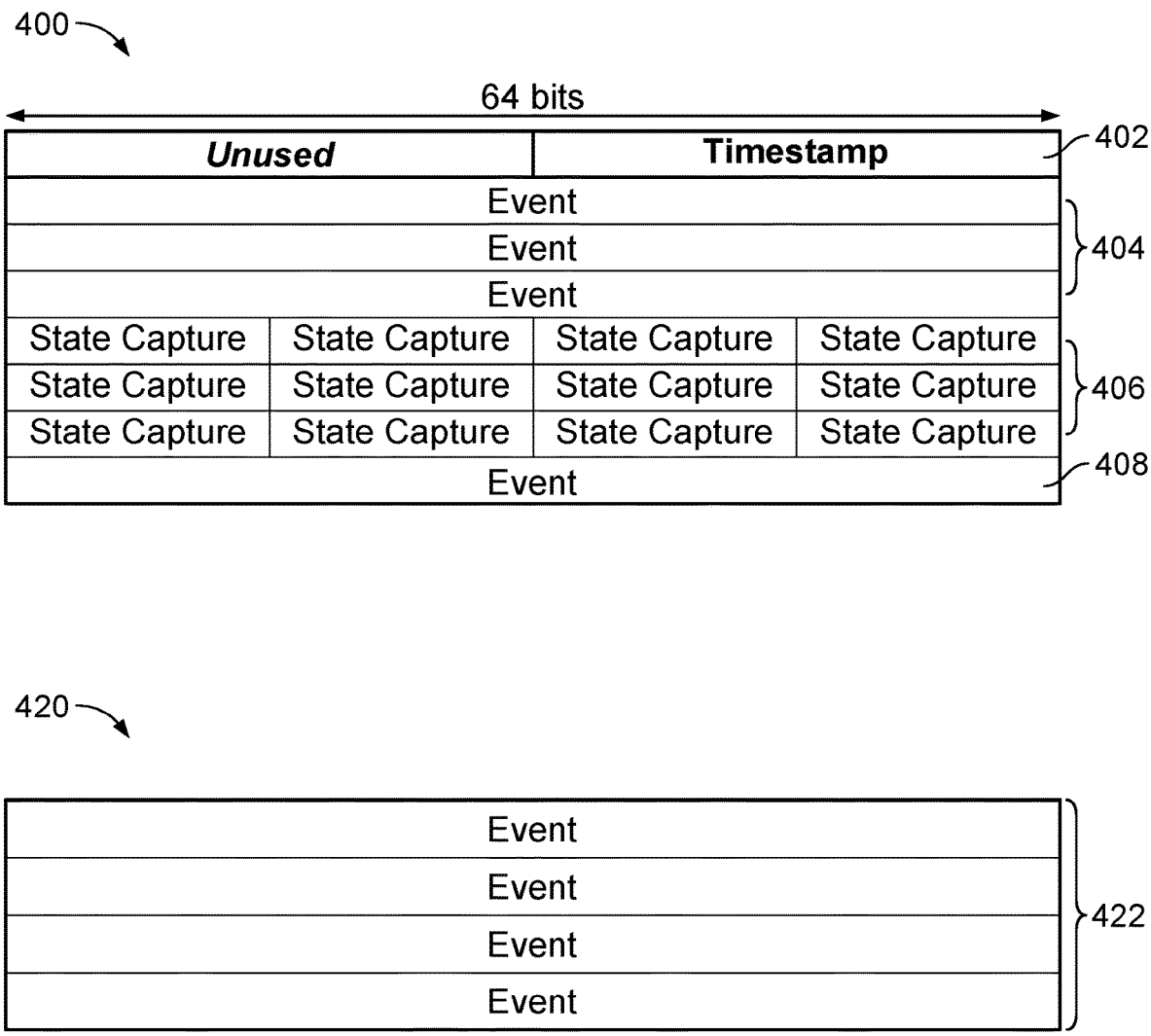
FIG. 4 is a diagram illustrating two embodiments of an aggregated and timestamped message stream in a message capture memory.

FIG. 4 is a diagram illustrating two embodiments of an aggregated and timestamped message stream in a message capture memory. In this figure, a first memory segment (400) and a second memory segment (420) show two examples of aggregated and timestamped message streams that are stored in message capture memory. For example, these two memory segments (400 and 420) show examples of memory (210) in FIG. 2.

In the first memory segment (400), a 32-bit timestamp message (402) occurs first, occupying one half of a 64-bit slot of memory; the remainder of the slot is unused. In this example, each slot of memory is 64 bits and the timestamp message (402) has the example size and format shown in FIG. 3.

Next, three 64-bit event messages (404) each occupy one memory slot so that the second, third, and fourth slots are occupied by event messages.

Then, a sequence of 12 time-based messages (406) is stored. Each time-based message (406) is 16 bits long so the fifth, sixth, and seventh slots each have four time-based messages per slot. In this example, time-based messages are used to capture the state or value of a finite state machine while it is not in the idle state (e.g., from the time it leaves the idle state until the time it returns to the idle state). As such, in this example, the term "state capture" is used to describe the time-based messages (406) but in other embodiments time-based messages are used to capture or record other types of information in a functional module.

The last slot is occupied by an event-based message (408).

In this example, each event-based message (e.g., 404) occupies a single slot whereas time-based messages (e.g., 406) are written four to a slot. The advantage of keeping the sizes and (slot) offsets as shown here is that less overhead information needs to be saved which would be required if (as an example) the event messages could start at any offset within a slot instead of at a zero offset. Similarly, if the message sizes were not multiples of each other and the messages did not align with the slots as shown here, then mixing the two messages randomly would make it very hard to distinguish between message boundaries when an old message is overwritten with a new message, creating partially messages. Partial messages can have missing type identifiers (to distinguish the message type) and/or missing message content (making it hard to identify the end of the message).

It is noted that the various event messages (404 and 408) and state capture (i.e., time-based) messages (406) may be from a variety of functional modules and are not necessarily from a single functional module. Rather, they are aggregated at the aggregation module in the order in which they are received.

A downside to embodiments that generate the first memory segment (400) shown is that supporting multiple message types (each having a different message size) adds to the complexity of the aggregation module. For example, to ensure that the last event message (408) starts at the beginning of the last slot, the aggregation module has to track the number of preceding state capture (i.e., time-based) messages (406) so that if the number is not a multiple of four, one or more unused fourth slots are inserted before the last event message (408). In some applications, a less complex implementation is desired, particularly if the debug system is being implemented for the first time. The following figure shows a less complex embodiment where only event messages are stored.

The second memory segment (420) shows an example where only event-based messages (422) are generated and stored. That is, neither timestamp messages nor state capture (i.e., time-based) messages are generated (e.g., by the reporting modules or the aggregation module) in this example.

A benefit to embodiments that generate and store only event-based messages (as shown in the second memory segment (420)) is that is it much simpler for the aggregation module to store messages because there only one type (and therefore size) of message that is supported. The aggregation module does not need to track the number of timestamp messages or state capture state capture (i.e., time-based) messages and insert unused fourth or half slots where needed. It is also more memory-efficient because there are not unused portions, and the total amount of memory used is less that the first memory configuration because there tend to be many state capture (i.e., time-based) messages whereas event-based messages tend to be more sparse. For these reasons, in some embodiments, only event-based messages are generated and stored.

Another way to conserve memory is to have configurable or selectable (e.g., event) reporting. The following figure shows an example of this.

FIG. 5 is a diagram illustrating an embodiment of selectable groups of events in a Flash storage controller application. In this example, the SOC system is a Flash storage controller (not shown) that writes to and reads from Flash storage media. For example, in FIG. 2, the SOC system (200) is a Flash storage controller and the (external) storage medium (218) is the Flash storage media that is controlled by the Flash storage controller. In some embodiments, the exemplary tables (500 and 540) are included in a set of reporting rules (see, e.g., steps 100 and 102 in FIG. 1) and/or in a reporting module (see, e.g., reporting module (204) in FIG. 2).

In this example, the Flash storage controller with the tables shown has hardware function modules (e.g., 202 in FIG. 2) that include a NVM Express (NVMe) processor, a NAND Flash controller, and an error correction decoder (e.g., to correct errors introduced when data is stored for a long time and/or in "leaky" Flash storage media). The hardware functional modules typically have one or more data processing in units of 4 KBytes, 8 Kbytes, and so on associated with every host command.

The firmware functional modules (e.g., 202 in FIG. 2) in the exemplary Flash storage controller include host management firmware, a Flash translation layer (FTL), and a backend module (e.g., associated with a plurality of NAND Flash interface controllers and/or a backend command parser), all running on one or more CPUs.

For both hardware and firmware functional modules, the important events that signify successful or failed completion of data operations include a start of data processing, end of data processing, and any unexpected error event like a CRC error or some index mismatch. Capturing these events can be highly valuable to debug system issues or valuable in understanding the system internal behavior.

However, depending on the application, in some cases a more "memory frugal" or sparse approach is desired where less information is generated and stored whereas in the other applications an approach that consumes much more memory is acceptable. For example, the former approach may be desirable is cases where there are no known bugs but the latter approach may be preferred if a bug is known to exist and it is very important to quickly identify a fix. To that end, in this example, a given reporting module has one more groups, where each group includes one or more events, and based on the selected groups, corresponding events are reported (if selected).

The first table (500) shows the groups and their events that are defined for an NVMe processor. Group 0 (502) includes three events: a write transfer end event (504) with an event ID of 0, a read transfer end event (506) with an event ID of 1, and an NVMe command start event (508) with an event ID of 2.

Group 1 (510) in the NVMe processor table (500) includes a single event: an NVME error event (512) with an event ID of 7.

Group 2 (514) in the NVMe processor table (500) includes three events: a write transfer command start (516) with an event ID of 3, a read transfer command start (518) with an event ID of 4, and an NVMe command end event (520) with an event ID of 5.

The NVMe processor has many events that are of interest, and so in this table (500), some of the groups have multiple events (e.g., group 0 (502) and group 2 (514)). In contrast, the error correction decoder has fewer events that are of interest, and so each group only contains a single event. In the error correction decoder table (530), group 0 (532) includes a decoder end event (534), which has an event ID of 0 and is associated with the end of writing the decoded data to some target. Group 1 (536) in the error correction decoder table (530) includes a decoder error event (538) with an event ID of 7. Group 2 (540) in the error correction decoder table (530) includes a decoder start event (542), which has an event ID of 1 and is associated with the start of reading encoded data from some source.

In this example, all error events (e.g., NVMe error (512) and decoder error (538) have an event ID of 7 (i.e., all ones) so that errors can be quickly and/or more easily located.

This example also organizes the groups according to a (e.g., typical or expected) degree of importance or interest. For example, events in group 0 (e.g., 502 and 532) are believed to have the most important or interesting events (e.g., for debugging and/or analysis purposes), those is group 1 (e.g., 510 and 536) are (slightly) less important and/or interesting, and those in group 2 (e.g., 514 and 540) are the least important and/or interesting.

In this example, each group has a corresponding select bit in the select column (522 and 544) so that each group can be selected independently of all other groups, even groups in other functional groups. In one example, if a very sparse reporting approach is desired, then only groups 0 (502 and 532) are selected. If more information is desired, then groups 0 and 1 (502, 510, 532, and 536) are selected. If it is very important to have all available information, then all of the groups (502, 510, 514, 532, 536, and 540) are selected. This is merely an example and with a corresponding select bit for each group (at least in this example), any combination of groups can be selected.

Below is an example of event-based messages that are generated by the NVMe processor functional module when all of the groups (502, 510, and 514) in that table (500) are selected. T1, T2, T3, and so on are chronologically incremental. Tn can be any time after T1.

First, a write transfer command start event message is generated, corresponding to the write transfer command start event (516). This message includes a functional module identifier that identifies the NVMe processor, a subtype and/or event ID of 3 (corresponding to the event that caused this message to be generated), payload with the logical block address number from the host (e.g., associated with the write), and a timestamp=T1.

Then, a write transfer end event message is generated, corresponding to the write transfer end event (504). This message includes a functional module identifier that identifies the NVMe processor, a subtype and/or event ID of 0 (corresponding to the event that caused this message to be generated), a payload with the logical block address number from the host (e.g., associated with the write transfer), and a timestamp of T2.

The last message in this example is an error event message, corresponding to the NVMe error event (512). This message includes a functional module identifier that identifies the NVMe processor, a subtype and/or event ID of 7 (corresponding to the event that caused this message to be generated), a payload with a link or address to the command for which there was an error), and a timestamp of T3.

In one example of a problem that can be debugged using the techniques described herein, suppose that a hardware functional module has a bug where that module does not send a completion status for a data operation in some exception cases (e.g., caused by very infrequent signal interactions). When this happens, a system resource (such as a buffer slot) may be unnecessarily held and not released (e.g., because it is waiting for a status of complete). At the system level, this manifests as a system stall or hang for a long time after the hardware functional module drops the event. However, using the reporting techniques described herein permits the reporting and/or generation of two event-based messages associated with the hardware functional module in question: a start data transfer event message and end data transfer event message for every data transfer operation. The exception is the faulty transaction where the end data transfer event message is not generated. By parsing the aggregated and timestamped stream that was generated and saved, the SOC developers were able to identify this discrepancy and the root cause (i.e., a particular hardware functional module started the data transfer, but did not complete the data transfer (or, at the very least, did not properly signal the completion of the data transfer). Without the techniques described herein, the ability to identify the root cause and fix the bug would take much longer and conceivably might never be found.

The following figure describes the above example (e.g., with selectable groups having one or more events) more generally and/or formally in a flowchart.

Figure 6:
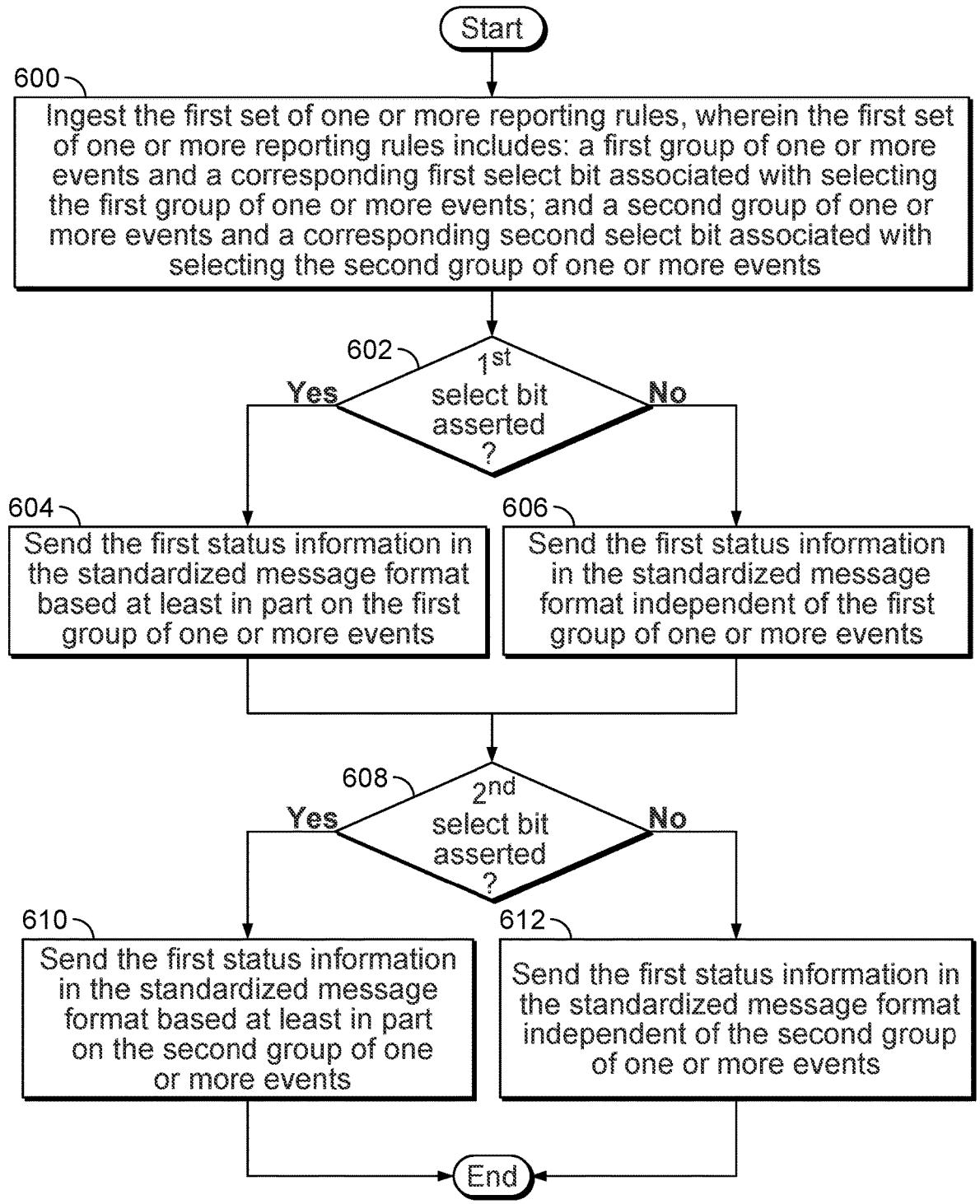
FIG. 6 is a flowchart illustrating an embodiment of a process to send first status information in a standardized message format.

FIG. 6 is a flowchart illustrating an embodiment of a process to send first status information in a standardized message format. In some embodiments, the process of FIG. 6 is used in step 100 in FIG. 1. Steps 100 and 102 in FIG. 1 are similar (in some cases, the same) and therefore the techniques described in the FIG. 6 may be applied to sending second status information in a standardized message format at step 102 in FIG. 1. The process of FIG. 6 may be performed by a reporting module (e.g., 204 in FIG. 2) in a functional module (e.g., 202 in FIG. 2).

At 600, the first set of one or more reporting rules is ingested, wherein the first set of one or more reporting rules includes: a first group of one or more events and a corresponding first select bit associated with selecting the first group of one or more events; and a second group of one or more events and a corresponding second select bit associated with selecting the second group of one or more events. FIG. 5, for example, shows some examples of groups (502, 510, 514, 532, 536, and 540) with one or more events (504, 506, 508, 512, 516, 518, 520, 534, 538, and 542).

As shown in the example of FIG. 5, in some embodiments, the first group of one or more events includes an end operation event and the second group of one or more events includes an error event.

FIG. 5 also shows that in some embodiments, the first group of one or more events includes an end operation event; the second group of one or more events includes an error event; and the first set of one or more reporting rules further includes a third group of one or more events that includes a start operation event.

At 602, it is determined whether the first select bit is asserted. In the event it is determined that the first select bit is asserted, at 604, sending the first status information in the standardized message format is based at least in part on the first group of one or more events. In the event it is determined that the first select bit is not asserted, at 606, the first status information is sent in the standardized message format independent of the first group of one or more events. To put it another way, the reporting module does not check for the events in the unselected first group and those events go unreported.

At 608, it is determined whether the second select bit is asserted. In the event it is determined that the second select bit is asserted, at 610, the first status information is sent in the standardized message format based at least in part on the second group of one or more events. In the event it is determined that the second select bit is not asserted, at 612, sending the first status information in the standardized message format occurs independently of the second group of one or more events. That is, the events in the second group go unreported because that group was not selected.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A storage controller, implemented on a system on chip (SOC), that manages a storage medium, comprising:
    an NVM Express (NVMe) processor, implemented on a hardware functional module, that:
        in the event a first group selection setting is set to TRUE, sends, to an aggregation module and in a standardized message format, a first set of NVMe status information according to a first set of one or more reporting rules via a first dedicated link between the NVMe processor and the aggregation module, wherein the first set of NVMe status information includes a transfer data end event; and
        in the event a second group selection setting is set to TRUE, sends, to the aggregation module and in the standardized message format, a second set of NVMe status information according to the first set of one or more reporting rules via the first dedicated link between the NVMe processor and the aggregation module, wherein the second set of NVMe status information includes an NVMe error event;
    a firmware functional module that sends, to the aggregation module and in the standardized message format, firmware status information according to a second set of one or more reporting rules via a second dedicated link between the firmware functional module and the aggregation module;
    the aggregation module that aggregates and timestamps:
        the first set of NVMe status information, if any, in the standardized message format;
        the second set of NVMe status information, if any, in the standardized message format; and
        the firmware status information in the standardized message format to obtain a timestamped and aggregated message stream, wherein the timestamped and aggregated message stream enables a visualization system to analyze the NVMe processor and the firmware functional module; and
    an interface that outputs the timestamped and aggregated message stream.

2. The storage controller recited in claim 1, wherein the transfer data end event includes one or more of the following: a write transfer data end event or a read transfer data end event.

3. The storage controller recited in claim 1, wherein the first set of NVMe status information further includes an NVMe command start event.

4. The storage controller recited in claim 1, wherein the NVMe processor further: in the event a third group selection setting is set to TRUE, sends, to the aggregation module and in the standardized message format, a third set of NVMe status information according to the first set of one or more reporting rules via the first dedicated link between the NVMe processor and the aggregation module, wherein the third set of NVMe status information includes a transfer command start event.

5. The storage controller recited in claim 4, wherein the transfer command start event includes one or more of the following: a write transfer command start event or a read transfer command start event.

6. The storage controller recited in claim 4, wherein the third set of NVMe status information further includes an NVMe command end event.

7. A method, comprising:
    using an NVM Express (NVMe) processor, implemented on a hardware functional module, to:
        in the event a first group selection setting is set to TRUE, send, to an aggregation module and in a standardized message format, a first set of NVMe status information according to a first set of one or more reporting rules via a first dedicated link between the NVMe processor and the aggregation module, wherein the first set of NVMe status information includes a transfer data end event; and
        in the event a second group selection setting is set to TRUE, send, to the aggregation module and in the standardized message format, a second set of NVMe status information according to the first set of one or more reporting rules via the first dedicated link between the NVMe processor and the aggregation module, wherein the second set of NVMe status information includes an NVMe error event;
    using a firmware functional module to send, to the aggregation module and in the standardized message format, firmware status information according to a second set of one or more reporting rules via a second dedicated link between the firmware functional module and the aggregation module;
    using the aggregation module to aggregate and timestamp:
        the first set of NVMe status information, if any, in the standardized message format;
        the second set of NVMe status information, if any, in the standardized message format; and
        the firmware status information in the standardized message format to obtain a timestamped and aggregated message stream, wherein the timestamped and aggregated message stream enables a visualization system to analyze the NVMe processor and the firmware functional module; and
    using an interface to output the timestamped and aggregated message stream, wherein the NVMe processor, the firmware functional module, the aggregation module, and the interface are included in a storage controller, implemented on a system on chip (SOC), that manages a storage is medium.

8. The method recited in claim 7, wherein the transfer data end event includes one or more of the following: a write transfer data end event or a read transfer data end event.

9. The method recited in claim 7, wherein the first set of NVMe status information further includes an NVMe command start event.

10. The method recited in claim 7, further including using the NVMe processor to: in the event a third group selection setting is set to TRUE, send, to the aggregation module and in the standardized message format, a third set of NVMe status information according to the first set of one or more reporting rules via the first dedicated link between the NVMe processor and the aggregation module, wherein the third set of NVMe status information includes a transfer command start event.

11. The method recited in claim 10, wherein the transfer command start event includes one or more of the following: a write transfer command start event or a read transfer command start event.

12. The method recited in claim 10, wherein the third set of NVMe status information further includes an NVMe command end event.

\* \* \* \* \*